UNITED STATES PATENT OFFICE 2,389,080

FLOTATION PROCESS FOR ORES CONTAINING SODIUM CHLORIDE

Philip A. Ray, Denver, Colo., assignor to Hercules Powder Company, Wilmington, Del., a corporation of Delaware No Drawing. Application October 10, 1944,
Serial No. 558,088

10 Claims. (Cl. 209—166)

This invention relates to a process of concentrating water-soluble ores and salt mixtures by flotation. Particularly, it relates to the concentration of ores and salt mixtures containing sodium chloride by froth flotation. More particularly, it relates to the use of a compound containing a cumate radical as a flotation reagent for separating potassium chloride of high purity from ores of salt mixtures containing that material in admixture with sodium chloride and other impurities.

It is known that soaps of high-molecular-weight fatty acids, such as cocoanut oil soaps and cottonseed oil soaps, are useful for the flotation of sodium chloride from potassium chloride.

Now, in accordance with this invention, it has been discovered that cumic acid and its water-soluble salts are useful as flotation agents in separating the components of an ore containing sodium chloride, such as sylvinite.

In accordance with this invention, a pulp of an ore or mixed salt containing potassium chloride is prepared in a saturated brine solution. Lead and/or bismuth cations are added and the pulp is subjected to a froth flotation process using a substance containing the cumate radical, such as cumic acid or a water-soluble salt of cumic acid, as a flotation reagent.

The process in accordance with this invention is illustrated by the following examples:

EXAMPLES 1–4

A saturated brine solution of a sylvinite ore, containing about 45% potassium chloride, 54% sodium chloride and 1% insoluble material, was prepared and allowed to stand until all the insoluble material had settled and the solution was clear. Twenty-two cubic centimeters of a lead acetate solution, which contained 30 g.

$$Pb(CH_3COO)_2.3H_2O$$

per 100 cc. of solution, was added to two liters of the brine solution and then the solution was poured into a 1000 g.-Denver "Sub A" flotation machine. While the brine solution was agitated, 1500 g. of sylvinite ore which was ground so that all of the particles were finer than 35 mesh (the same ore that was used to prepare the brine solution) was added to the flotation machine. Then a 5% solution of the flotation reagent given in Table I was added to the pulp in an amount shown in the table. A few minutes were allowed for the reagent to contact the mineral and then the pulp was aerated. A good froth was produced immediately and sodium chloride floated and collected therein. The froth was scraped off for a period of about seven minutes, after which time practically no sodium chloride was present in the froth.

During the flotation period additional brine solution containing the lead acetate was added from time to time to maintain the proper pulp level. The mineral that had floated and the tailings were filtered using brine solution as the washing liquid. The filter cakes were weighed both wet and dry and a correction made for the salts dried into the products. The floated mineral and the tailings were pulverized, sampled, and analyzed for potassium chloride. The percentage of the float or tailings that was potassium chloride is given under the heading "KCl corrected." The results are given in the following table:

Table I

| Example | Flotation agent | Lb./ton | KCl corrected | KCl recovery |
|---|---|---|---|---|
| | | | Per cent | Per cent |
| 1 | Sodium cumate | 0.33 float | 13.6 | 18.5 |
| | | tail | 99.8 | 81.5 |
| | | | | 100.0 |
| 2 | do | 0.18 float | 12.1 | 12.9 |
| | | tail | 91.7 | 87.1 |
| | | | | 100.0 |
| 3 | Sodium salt of mixed acids.[1] | 0.33 float | 8.9 | 10.9 |
| | | tail | 96.1 | 89.1 |
| | | | | 100.0 |
| 4 | do | 0.18 float | 9.6 | 10.2 |
| | | tail | 89.2 | 89.8 |
| | | | | 100.0 |

[1] The sodium salt of the acidic fraction is obtained by bubbling air through a mixture of approximately equal parts of p-cymene and water in the presence of a small amount of potassium permanganate while the mixture is efficiently agitated until the oily layer had a specific gravity of about 1.52. The acid fraction was separated from the oily layer with dilute sodium hydroxide. The mixed acids had a melting point of 98–102° C.

In order to compare the results of using sodium cumate as a flotation reagent with the results of using cocoanut oil soap as a flotation reagent, the following test was carried out. The procedure was similar to that of Example I. Three-tenths pound cocoanut oil soap per ton of ore was added and the first froth was taken off for five minutes. Another 0.3 pound of cocoanut oil soap per ton of ore was added to float a middling product for five minutes. One-tenth pound of cresylic acid per ton of ore was added with the soap in both cases. The results are as follows:

Table II

| | KCl corrected | KCl recovery |
|---|---|---|
| | Per cent | Per cent |
| Float | 9.3 | |
| Middling | 9.6 | |
| Tail | 85.5 | 88.5 |

Example 5

A pulp was prepared of sylvinite ore which had the following screen analysis in which the results are expressed as percentage of ore retained:

| | Per cent |
|---|---|
| 28 mesh | 1.8 |
| 35 mesh | 18.2 |
| 48 mesh | 19.4 |
| 65 mesh | 16.0 |
| 100 mesh | 12.8 |
| 150 mesh | 7.4 |
| 200 mesh | 7.2 |
| 325 mesh | 4.0 |
| Finer than 325 mesh | 13.2 |

Cumic acid (melting point 116–117° C.) was neutralized with a sodium hydroxide solution in the presence of water to give a 1% solution of sodium cumate. This was added to the sylvinite ore pulp in amounts equivalent to 0.66 pound per ton of ore. The float was taken off for five minutes leaving a high-grade potassium chloride product, as shown by the following results.

*Table III*

| | KCl corrected | KCl recovery |
|---|---|---|
| | Per cent | Per cent |
| Float | 22.0 | 26.8 |
| Tail | 89.1 | 73.2 |
| | | 100.0 |

Example 6

The ore and method described in Example 4 were used. Five-tenths pound of cumic acid per ton of ore was added to the pulp. A froth was removed for five minutes and 30.2% of the ore was obtained in the froth. The float was practically all sodium chloride.

In carrying out this invention, a saturated solution of the ore containing sodium chloride is prepared at the temperature at which it is to be used. Room temperature (about 70° F. to about 80° F.) is preferred. The ore is ground to a suitable size by any of the usual methods of dry or wet grinding and mixed with the saturated brine solution. The temperature of the pulp should be kept as nearly constant as possible so that the sodium chloride and other salts will not be further dissolved or precipitated from the solution. Lead and/or bismuth cations are added to the saturated brine. A flotation agent containing the cumate radical is added to the pulp, which is then subjected to froth flotation. The substance containing the cumate radical acts as a collecting agent for sodium chloride. The sodium chloride appears in the froth and the potassium chloride or other salt remains in the tailings.

Any water-soluble substance containing the cumate radical may be used as a flotation reagent. For example, suitable agents include cumic acid, sodium cumate, potassium cumate, lithium cumate, calcium cumate, etc. The cumic acid may be prepared by the air-oxidation of p-cymene. The cumic acid or its water-soluble salts may be used in pure form or mixed with the other acids prepared by the oxidation of p-cymene, such as p-toluic acid, terephthalic acid, acetyl benzoic acid, isopropenyl benzoic acid or their salts. The acidic fraction obtained from the air-oxidation of p-cymene or the water-soluble salts of this acidic fraction may be used as flotation agents in accordance with this invention. The p-cymene is oxidized under such conditions that an effective amount of cumic acid is present.

The flotation reagent may be added to the pulp by any suitable manner, for example, directly into the flotation machine or into a conditioning apparatus. The amount of flotation agent may be between about 0.01 lb. and about 2 lbs. per ton, preferably between about 0.05 and about 0.5 lb. per ton of ore.

Any ore containing sodium chloride may be treated in accordance with this method. Ores which may be suitably concentrated include sylvinite, langbeinite and mixtures containing sodium chloride and potassium nitrate.

The lead and/or bismuth salts are essential constituents of the pulp in the performance of the process. The term "cation of the lead, bismuth class" will be used to designate any composition having the characteristics of lead cations in a sylvinite solution. The amount of lead or bismuth cations added will be between about 1.0 and about 3.0 g. per liter of brine, preferably between about 1.5 and about 2.0 g. of lead per liter of brine.

It is sometimes advantageous to add agents, such as cresylic acid, creosols, pine oil, petroleum hydrocarbons, kerosene, etc., which function as foam depressants, in order to control the volume of the froth. However, since sodium cumate and similar salts are more efficient than soap reagents and since less sodium cumate is required than soap, usually a froth problem is not encountered.

When using sodium cumate as a flotation reagent much less of the reagent is needed to produce a high-grade potassium chloride concentrate from sylvinite than when using the prior art reagents. Furthermore, a coarser ground ore may be floated and a higher grade potassium chloride is recovered when a cumate anion is used than when soaps are used as the flotation agent. Usually some calcium and magnesium salts are present in the sylvinite ore and in the water and these form insoluble salts with the soap reagents thus using up part of the reagent. Since calcium and magnesium cumate are soluble, this disadvantage is overcome by using a substance containing the cumate radical as the flotation reagent.

What I claim and desire to protect by Letters Patent is:

1. A flotation process which comprises treating a pulp or an ore containing sodium chloride with a water-soluble compound containing the cumate radical as a flotation agent.

2. A flotation process which comprises treating a pulp of an ore containing sodium chloride in a saturated solution of said ore, said pulp containing cations of the lead, bismuth class, with a water-soluble compound containing the cumate radical as a flotation agent.

3. A flotation process which comprises treating a pulp of a sylvinite ore in a saturated solution of said ore, said pulp containing cations of the lead, bismuth class, with sodium cumate.

4. A flotation process which comprises treating a pulp of a sylvinite ore in a saturated solution of said ore, said pulp containing cations of the lead, bismuth class, with cumic acid.

5. A flotation process which comprises treating a pulp of a sylvinite ore in a saturated solution of said ore, said pulp containing cations of the lead, bismuth class, with the sodium salts of acids prepared by the oxidation of p-cymene.

6. A flotation process which comprises treating a pulp of a sylvinite ore in a saturated solution of said ore, said pulp containing cations of the lead, bismuth class, with between about 0.01 lb. and about 2 lbs. of sodium cumate per ton of ore.

7. A flotation process which comprises treating a pulp of a sylvinite ore in a saturated solution of said ore, said pulp containing cations of the lead, bismuth class, with between about 0.01 lb. and about 2 lbs. of cumic acid per ton of ore.

8. A flotation process which comprises treating a pulp of a sylvinite ore in a saturated solution of said ore, said pulp containing cations of the lead, bismuth class, with between about .01 lb. and 2 lbs. of sodium cumate per ton of ore, removing the froth containing sodium chloride and recovering the potassium chloride.

9. A flotation process which comprises treating a pulp of a sylvinite ore in a saturated solution of said ore, said pulp containing cations of the lead, bismuth class, with between about .01 lb. and about 2 lbs. of cumic acid per ton of ore, removing the froth containing sodium chloride and recovering the potassium chloride.

10. A flotation process which comprises treating a pulp of a sylvinite ore in a saturated solution of said ore, said pulp containing cations of the lead, bismuth class, with sodium salts of the acids prepared by the oxidation of p-cymene, removing the froth containing sodium chloride and recovering potassium chloride.

PHILIP A. RAY.